June 13, 1967 K. R. HARRIS 3,324,583
ARTICULATED GRADER
Filed Aug. 5, 1964 3 Sheets-Sheet 1
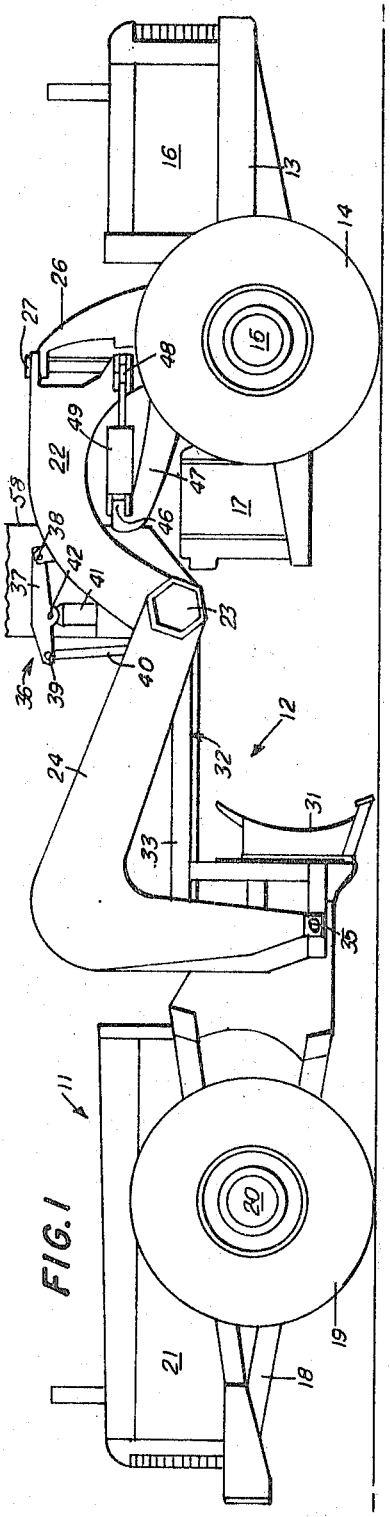
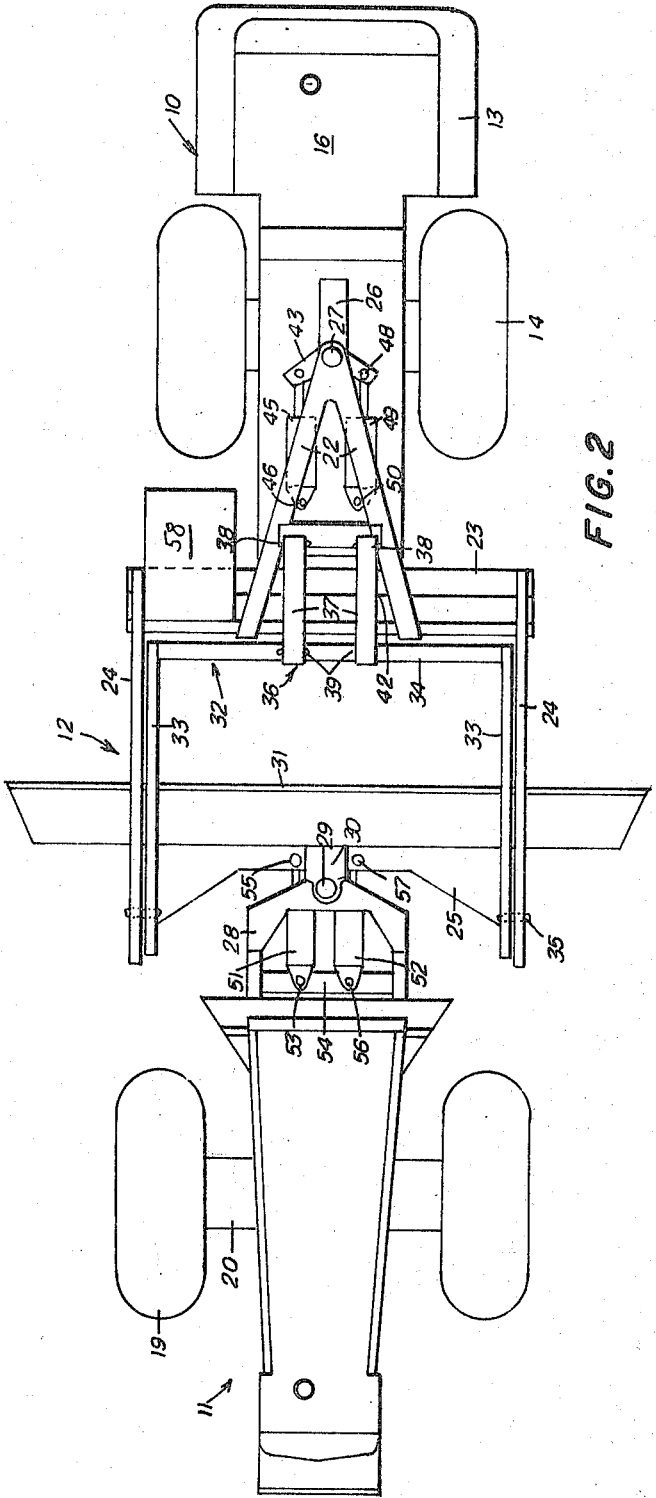

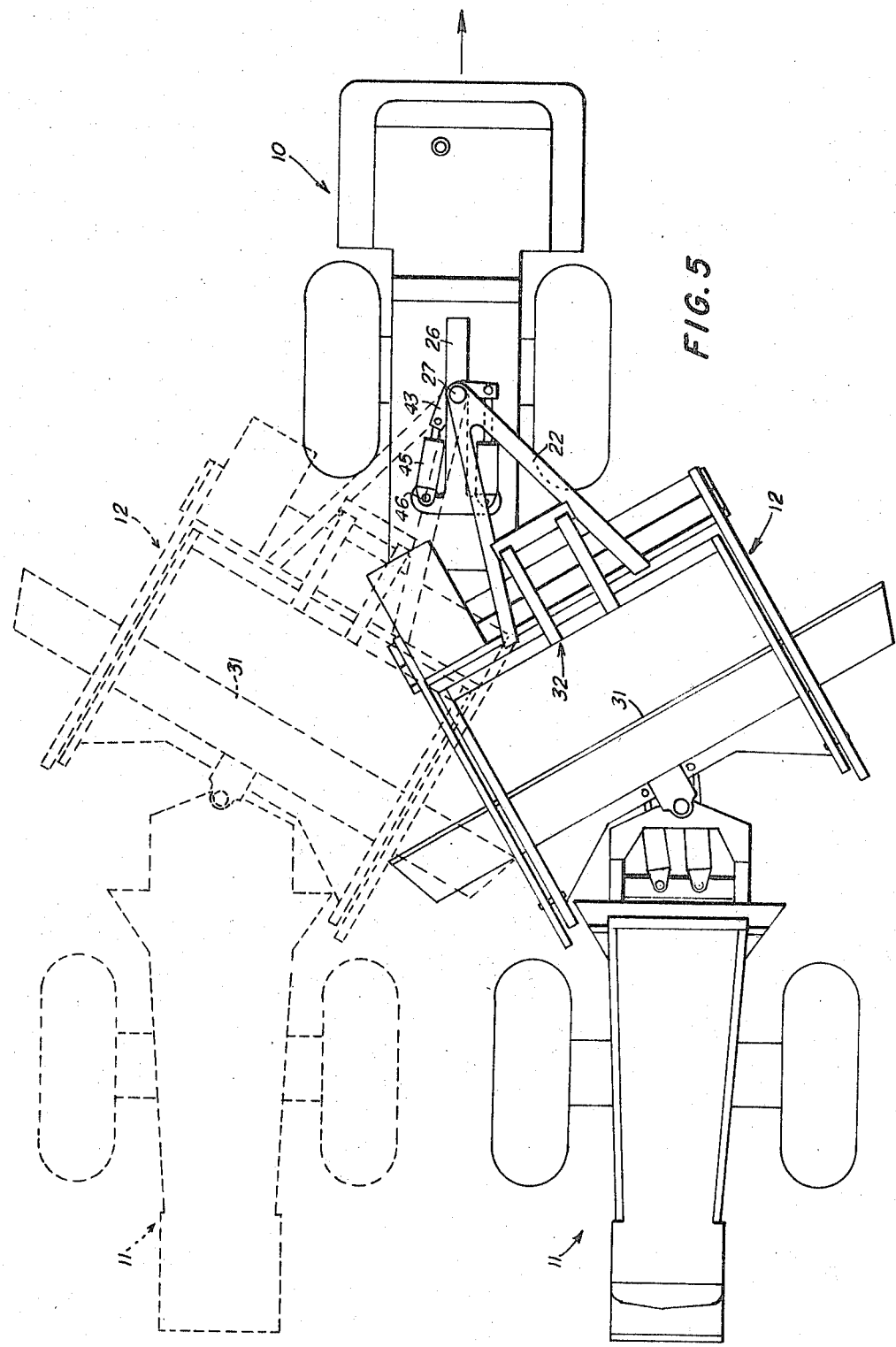

3,324,583
ARTICULATED GRADER
Kenneth R. Harris, 3900 N. Cliff Ave.,
Sioux Falls, S. Dak. 57104
Filed Aug. 5, 1964, Ser. No. 387,575
1 Claim. (Cl. 37—153)

This invention relates to earth-working machines, and more particularly to a self-powered grader for levelling the ground over large areas preliminary to final landscaping or other operations on the surface such as road building or paving.

It is therefore an object of the invention to provide a heavy grader driven by tandem traction units and capable of being controlled by a single operator.

It is a further object of the invention to provide an earth-working moldboard supported by tandem self powered units and capable of control by a single operator to position the powered units on opposite sides of the windows left by the moldboard.

Figure 3:
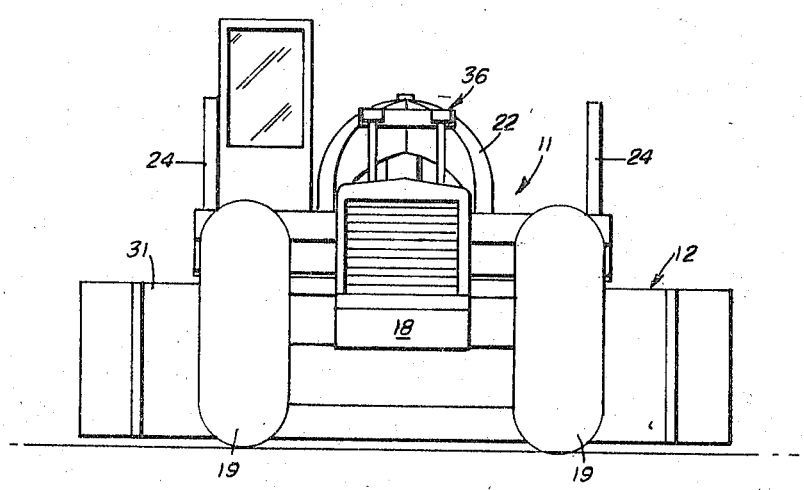
Figure 4:
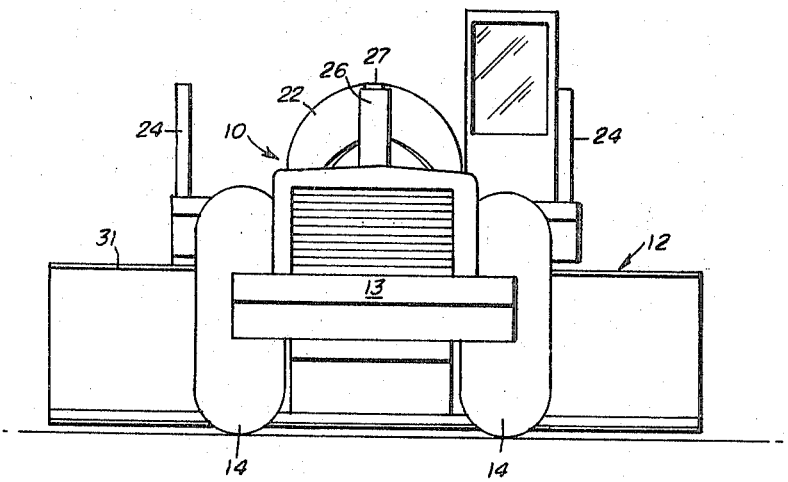

Other objects and advantages of the invention will be apparent to those skilled in the art after reading the following specification in connection with the annexed drawings, in which, FIGURE 1 is a side elevation of a preferred form of articulated grader constructed in accordance with this invention; FIGURE 2 is a plan view of the same; FIGURE 3 is a rear elevation; FIGURE 4 is a front elevation, and; FIGURE 5 is a plan view of the grader showing it in solid lines in a position to throw material towards the left, and in dotted lines toward the right.

Referring now to the drawings in detail, numeral 10 indicates generally a front self powered traction unit, numeral 11 indicates a rear self powered traction unit, and numeral 12 indicates generally a grader unit supported between the two traction units.

The front traction unit includes a frame 13 supported on a pair of ground engaging wheels 14 connected with the frame by a straight axle 15. A prime mover, such as an internal combustion engine 16 supplies power to drive the wheels through a conventional transmission indicated by numeral 17.

The rear traction unit includes a frame 18 supported on ground engaging wheels 19 by means of a straight axle 20. A prime mover, such as an internal combustion engine 21 is mounted on the frame to furnish power for driving the wheels 19.

While the traction units shown in the drawings are supported on wheels, it will be understood that other types, such as those having crawler treads, could be substituted for one, or both, of the units shown.

The grader unit 12 is supported on a frame which comprises a split gooseneck portion, or yoke, 22 welded at its rear end with a heavy tubular horizontally extending beam 23, the extremities of which, in turn, are welded to a pair of horizontally spaced, L-shaped vertically extending side frame members 24. The side frame members are also joined to each other at their lower ends by means of another horizontal frame member 25.

The yoke 22 is connected with a pedestal 26 extending upwardly from the frame of the front traction unit by means of a vertical pivotal connecting means 27 of well known construction which, while permitting a certain amount of angular displacement between the traction unit and the grader about a vertical axis, also restrains the traction unit from pitching forward or tiling up about a transverse horizontal axis. Similarly the forward cross brace 28 of the rear traction unit is connected by pivotal connection 29 with the center portion 30 of the rear horizontal frame 25 of the grader unit so as to permit angular displacement between the rear traction unit and the grader about a vertical axis while restraining the rear traction unit from tilting about a transverse horizontal axis.

The horizontal grader blade, or moldboard, 31 is mounted on a subframe, indicated generally by numeral 32, for vertical movement. This subframe comprises a pair of side members 33, joined together at their front ends by a transverse member 34 while at their rear ends they are connected with the respective side frames 24 by means of horizontal pivots 35. Vertical movement of the grader blade is accomplished by means of a hydraulically operated elevating mechanism, indicated generally by numeral 36, which may be operated from the driver's seat by means of the usual controls (not shown). Although the particular elevating mechanism employed is not important, in this instance it comprises a pair of rocker arms 37 pivotally connected at their forward ends 38 to the yoke 22 while at their rear ends 39 they are pivotally connected with a pair of supporting arms 40 which in turn are pivotally connected at their lower ends with the transverse member 34. A pair of double-acting hydraulic cylinder-and-piston actuators 41 have pivotal connections 42 with a medial portion of the rocker arms, while their lower ends are pivotally connected with the cross beam 23.

The angular relationship between the grader unit and each of the traction units is controlled by hydraulically operated mechanisms which will now be described. Attached to the yoke 22 of the front traction unit is a horizontal arm 43. Pivotally connected at 44 is one end of a double acting hydraulic actuator 45 while the other end of this actuator is pivotally connected at 46 to a rearwardly extending portion 46 of the frame of the front traction unit. The other end of arm 43 has a pivotal connection 48 with one end of another double acting hydraulic actuator 49, the other end of this actuator being pivotally connected at 50 with another portion of the frame 47. At the rear end of the grader a pair of double-acting hydraulic actuators 51 and 52 control the relationship between the grader and the rear traction unit. Actuator 51 is pivotally connected at 53 with a cross brace 54 on the framework of the traction unit while the other end of the actuator is pivotally connected at 55 with the horizontal frame 25 at a point spaced to the left of the pivot 29 between the grader and the traction unit. The other actuator has one end pivotally connected at 56 with the cross brace 54 spaced to the right of the pivot 53, and has its other end pivotally connected at 57 with the frame 25 to the right of the pivot 29.

Control of the engines and brakes of the two traction units and the hydraulic actuators is centralized in an operator's cab 58. The various actuators are supplied by flexible conduits (not shown) connected with an hydraulic supply (not shown) driven by either one, or both, of the engines. Mechanisms for starting, stopping, and controlling the speed of the engines individually, or simultaneously from a remote point, are well known in the art and do not, of themselves, form any part of this invention. Similarly, valve devices for controlling the supply of fluid to a plurality of hydraulic actuators, either singly or in groups, are also well known and do not, of themselves, form any part of this invention.

In operation, it will be obvious that for travelling to, and from, a work site, the moldboard will be raised above the ground by the operator. To steer the assembly for making ordinary turns to the right or left when travelling in a forward direction, the front traction unit 10 can be turned with respect to the grader unit 12 about the pivot 27 by controlling the supply of fluid to actuator 45 and 49 so as to simultaneously extend one and contract the other. If the turn is to be made to the right, actuator 49 is extended and actuator 45 is contracted, as shown in solid lines in FIG. 5. If the turn is to the left, the positions of the actuators would be reversed.

It should also be borne in mind that, if the vehicle as a whole is executing a turn, the rear unit 11, can be held in alignment with the grader unit 12, as shown in FIG. 2, while the front unit is being turned, or if a sharp turn is to be made the rear unit can be swung about the pivot 29 in a counterclockwise direction, as viewed in FIG. 2, by extension of actuator 51 and simultaneous contraction of actuator 52 for a right turn. If the turn is to the left, actuator 51 is contracted, and actuator 52 extended, to swing the rear unit in a counterclockwise direction.

Still further, it will be understood that, even though the vehicle is moving in a forward direction, a turn can be executed in either direction by swinging the rear unit about the pivot 29 while holding the front unit fixed with respect to the grader unit. Finally, it is also possible, when driving in reverse (towards the left in FIG. 1) to steer the machine by turning either one of the traction units, or both, in their respective appropriate directions.

However, a particular advantage of the present machine is that the two traction units can be positioned in such a way that the windrow of earth left by the moldboard can be placed completely to one side, or the other, of the rear unit. This is shown in FIG. 5, wherein the solid lines show both the front and rear traction units turned in a clockwise direction with respect to the grader unit and with the same angular amount, so that the traction units move forwardly in parallel directions with the rear unit displaced to the right. In these relative positions, the moldboard being fixed to the grader frame with respect to a vertical axis, and the grader being now angularly displaced with respect to the direction of travel, the earth will be deposited in a windrow as it leaves the left hand side of the moldboard. Under these conditions it should also be understood that if the grader is following a previously deposited windrow, the front unit will not be driven over it, but will be well spaced to the left of it during its movement; while the rear unit will not pass over the newly formed windrow, as it follows a path spaced to the right of it.

The dotted lines show the relative positions of the units if the traction units are turned in counterclockwise directions with respect to the grader unit. Again, the traction straddle the opposite sides of the windrow, with the newly formed one being deposited to the right of the rear unit.

Having disclosed a preferred form in which the invention may be practiced it will be apparent that various changes and improvements could be made which would come within the scope of the annexed claim.

In earth working machinery, the combination including first and second self-contained prime mover units each including a pair of ground engaging driving wheels, main frame means including a first pair of horizontally spaced members extending longitudinally between said prime mover units and including pivotal connection means between each prime mover unit and a respective end of the main frame means for supporting the main frame means for limited angular displacement with respect to each prime mover unit about generally parallel vertical axes, subframe means including a horizontal grader blade, said subframe means including a second pair of horizontally spaced side members attached to and extending rearwardly of the grader blade and being pivotally connected respectively to the horizontally spaced first pair of members of the main frame means for movement of the grader blade about a horizontal axis, a portion of said subframe means also extending forwardly of the grader blade and including hydraulic actuator means connected between the main frame means and said forwardly extending portion of the subframe means for raising and lowering the grader blade, and control means for said hydraulic actuator means.

References Cited

UNITED STATES PATENTS

| | | | |
|---|---|---|---|
| 768,181 | 8/1904 | Johnson | 37—168 |
| 2,176,503 | 10/1939 | Leppert | 37—153 |
| 2,494,324 | 1/1950 | Wright | 37—156 |
| 3,145,489 | 8/1964 | Smith | 37—179 |

FOREIGN PATENTS 42,493   2/1888   Germany.

ABRAHAM G. STONE, *Primary Examiner.*

R. L. HOLLISTER, *Assistant Examiner.*